United States Patent
Thompson et al.

(10) Patent No.: US 6,185,332 B1
(45) Date of Patent: Feb. 6, 2001

(54) CHARACTER RECOGNITION TECHNIQUE

(75) Inventors: Archie L. Thompson, San Jose; Richard A. Van Saun, Menlo Park, both of CA (US)

(73) Assignee: FaxTrieve, Inc., Mountain View, CA (US)

( * ) Notice: Under 35 U.S.C. 154(b), the term of this patent shall be extended for 0 days.

(21) Appl. No.: 09/296,933

(22) Filed: Apr. 22, 1999

(51) Int. Cl.$^7$ ............................................. G06K 9/68
(52) U.S. Cl. .................................. 382/186; 382/219
(58) Field of Search ................................ 382/209, 217, 382/218, 219, 220, 221, 222, 186

(56) References Cited

U.S. PATENT DOCUMENTS

| | | | |
|---|---|---|---|
| 4,155,072 | * 5/1979 | Kawa | 382/186 |
| 4,510,617 | * 4/1985 | Mori | 382/219 |
| 4,556,985 | * 12/1985 | Hongo | 382/220 |
| 4,712,242 | 12/1987 | Rajasekaran et al. | 704/253 |
| 5,271,068 | * 12/1993 | Ueda et al. | 382/220 |
| 5,291,560 | 3/1994 | Daugman | 382/222 |
| 5,319,721 | 6/1994 | Chefalas et al. | 382/160 |
| 5,325,447 | 6/1994 | Vogt, III | 382/102 |
| 5,438,631 | 8/1995 | Dai | 382/197 |
| 5,479,533 | 12/1995 | Tanaka | 382/161 |
| 5,515,455 | 5/1996 | Govindaraju et al. | 382/186 |
| 5,802,204 | 9/1998 | Basehore | 382/186 |
| 5,802,207 | 9/1998 | Huang | 382/224 |
| 5,805,727 | 9/1998 | Nakano | 382/195 |
| 5,805,747 | 9/1998 | Bradford | 382/186 |
| 5,812,698 | 9/1998 | Platt | 382/186 |
| 5,838,820 | 11/1998 | Bergman | 382/187 |
| 5,841,901 | 11/1998 | Arai et al. | 382/187 |

* cited by examiner

Primary Examiner—Jon Chang
(74) Attorney, Agent, or Firm—Townsend and Townsend and Crew LLP; Kenneth R. Allen

(57) ABSTRACT

The present invention includes a method, a computer product and a system each of which features fitting a spatial recognition technique to enable a microprocessor to recognize hand-written characters, referred to herein as a cipher. This is achieved by fitting the cipher to a matrix having a plurality of cells with each cell having a plurality of pixels corresponding thereto and determining whether said cipher may be equally distributed among the plurality of cells. In this fashion, a subset of the pixels of a subgroup of the plurality of cells have a sub-portion of the cipher associated therewith and it is determined whether the number of pixels associated with each portion of the cipher are equal. If not, cells have excess pixels associated with a portion of the cipher, compared to other cells in the matrix, have the excess pixels assigned to a different cell. This facilitates creating a digital word that describes the cipher that is then compared with information in a look-up table. The digital information of each entry in the look-up table is compared with the digital word. A fuzzy logic algorithm determines the closest matches in the look-up table, and the cipher that corresponds to the closest match is identified.

27 Claims, 2 Drawing Sheets

CHARACTER RECOGNITION TECHNIQUE

BACKGROUND OF THE INVENTION

The present invention relates to pattern and cipher recognition, particularly where a hand-written character has been digitized and is presented in the form of a pixel matrix.

Known character recognition systems achieve accuracy by either placing restrictions on the writer or by requiring substantial computer processing time and/or memory. Current character recognition techniques typically include normalizing and thinning an image corresponding to a character before determining image representation. This typically requires use of an extensive database for template matching necessitating a memory consuming dictionary to find possible matches between the image and words. The computer resources required reduces the efficiency of these techniques in computers having limited computational power. Some techniques for recognition of hand-written characters necessitates formation of the characters with a predetermined sequence of strokes, often having predetermined start and end points. Other techniques require that characters be formed with a single continuous stroke. The aforementioned constraints associated with prior art hand-written character recognition techniques requires users to create characters unnaturally. This often increases the time required for a user to become proficient with a particular character recognition system. The user must become accustomed to the constraints and learn to create characters in accordance with the same.

What is needed, therefore, is a character recognition technique that substantially reduces the constraints imposed upon a user when creating characters.

SUMMARY OF THE INVENTION

The present invention includes a method, a computer product and a system, each of which features a static recognition technique that facilitates accurate character recognition while substantially reducing the constraints placed on an end-user. To that end, a hand-written character, referred to herein as a cipher, is overlayed with a matrix having a plurality of cells with each cell having a plurality of pixels corresponding thereto. A subset of the pixels of a subgroup of the plurality of cells have a sub-portion of the cipher associated therewith, and it is determined whether the number of pixels associated with each portion of the cipher are equal. If not, cells having excess pixels compared to other cells in the matrix, have the excess pixels assigned to a different cell. This facilitates creating a digital word that describes the cipher that is then compared with information in a look-up table. The bits in the digital word correspond to a binary state of each of the cells in the matrix, i.e., whether a logical "0" corresponds to a cell or a logical "1". An additional digital word is created that corresponds to the spatial position within the matrix where excess pixels are assigned. The information in the look-up table includes a plurality of known ciphers, each of which includes a corresponding digital representation. The digital information of each entry in the look-up table is compared with the digital word. A fuzzy logic algorithm determines the closest matches in the look-up table, and the cipher that corresponds to the closest match is identified. If more than one cipher in the look-up table is identified as a match, the digital representations corresponding thereto are processed and chosen as a function of the number of times the same cipher is identified as a match. The known cipher that is determined to match the digital word is provided, as needed. In other words, a visual representation of the known cipher may be presented on a display, or the known cipher may be stored in either a volatile of non-volatile memory.

These and other embodiments of the present invention, as well as its advantages and features, are described in more detail in conjunction with the text below and attached figures.

DESCRIPTION OF THE SPECIFIC EMBODIMENTS

Figure 1:
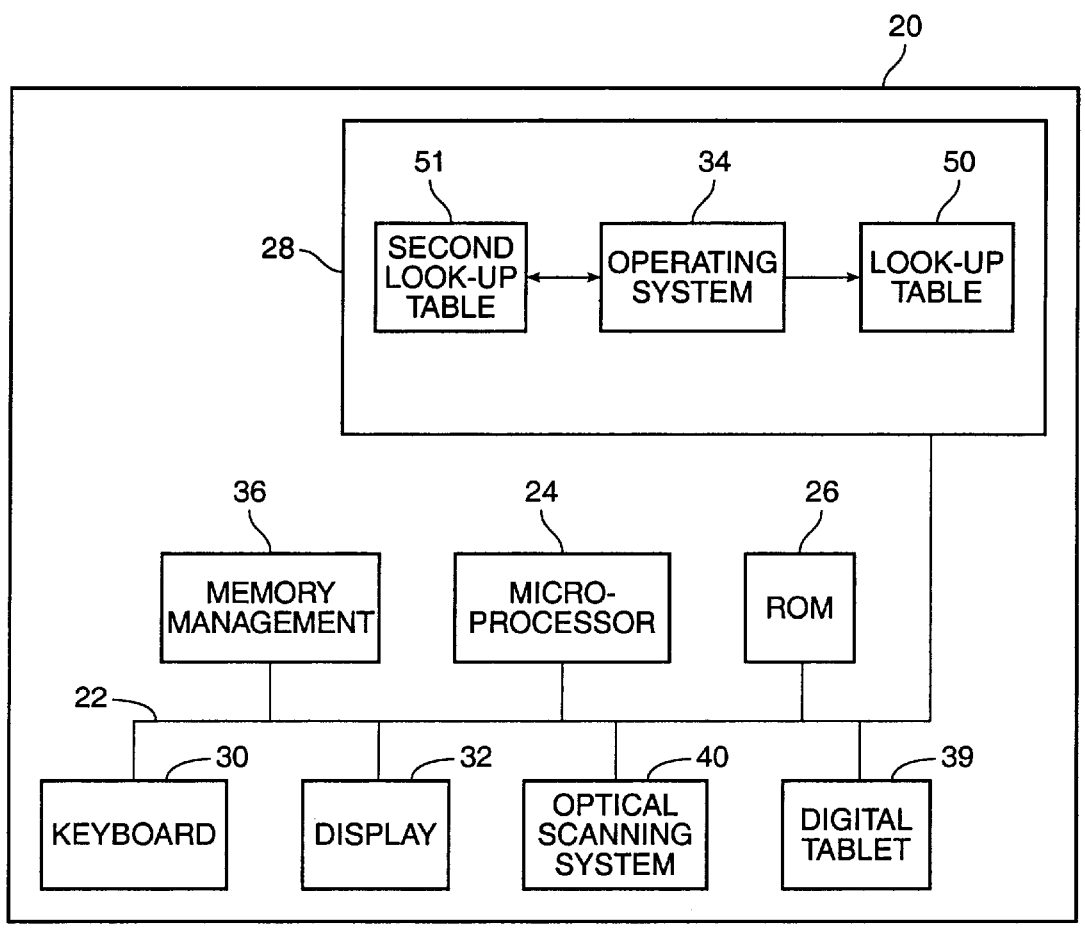
FIG. 1 is a plan view of a character recognition system in accordance with the present invention.

Referring to FIG. 1, an exemplary cipher recognition system 20 in accordance with the present invention includes one or more system buses 22 placing various components of the system 20 in data communication. For example, a microprocessor 24 is placed in data communication with both a read only memory (ROM) 26 and random access memory (RAM) 28 via the system bus 22. The ROM 26 contains among other code, the Basic Input-Output system (BIOS) which controls basic hardware operation such as the interaction with peripheral devices. Examples of the peripheral devices include a keyboard 30, a display 32, a digital tablet 39 and an optical scanning system 40. The RAM 28 is the main memory into which the operating system 34 and the present invention resides. The operating system 34 may be any known system.

Figure 2:
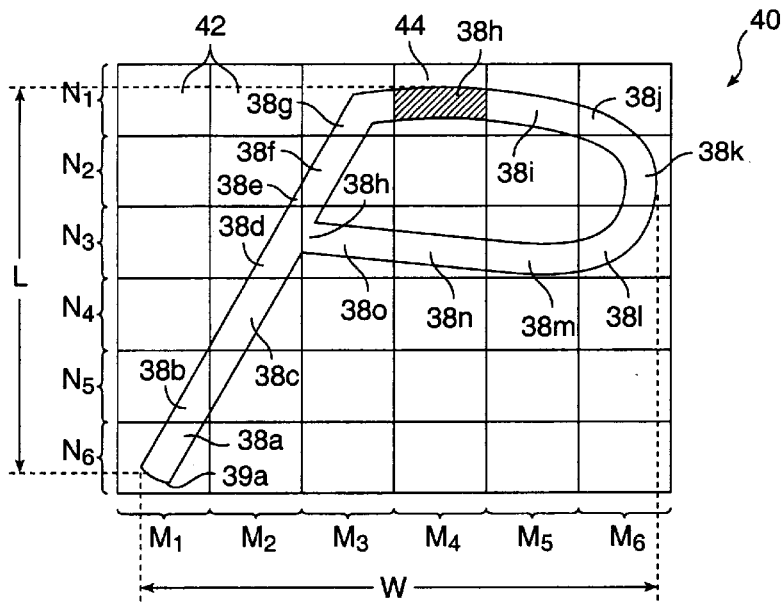
FIG. 2 is a plan view of a cipher overlayed with a quantization matrix in accordance with the present invention.

Referring to both FIGS. 1 and 2, the present invention operates in response to the detection of a graphical object, such as a cipher 38. The cipher 38 may be detected by the optical scanning system 40 in data communication with the microprocessor 24, or it may be detected by sensing pressure or capacitive changes on the display 32 or digital tablet 39, as is well known in the character recognition art.

Figure 3:
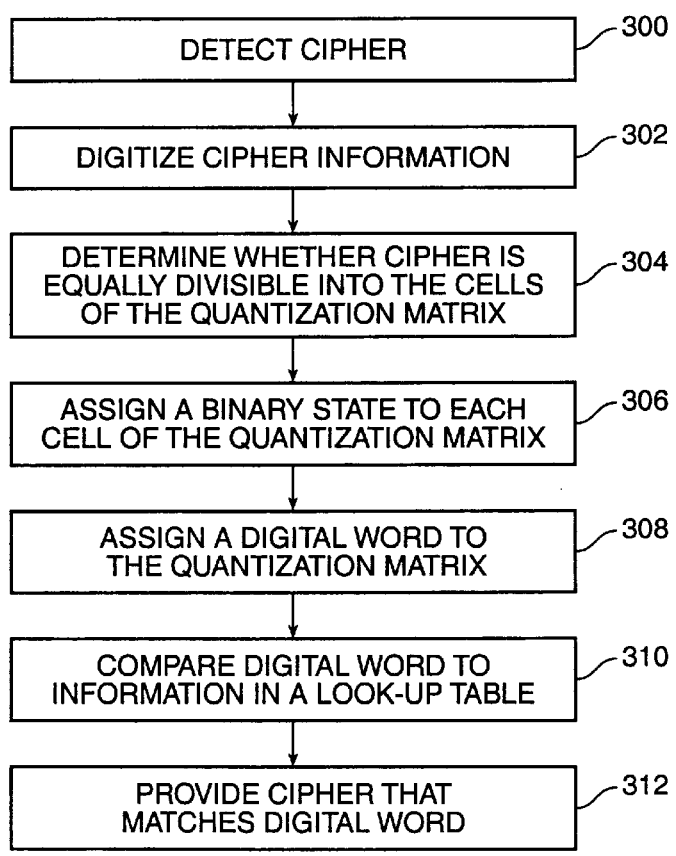
FIG. 3 is a flow chart showing a method of recognizing a hand-written character in accordance with the present invention.

Referring to FIGS. 1, 2 and 3, after the cipher 38 has been detected, at step 300, character information corresponding thereto is stored in RAM 28, at step 302. To that end, the cipher 38 is retrieved as an array of information, with each bit in the array representing a pixel in the cipher 38 that has been overlayed with a quantization matrix 40. Specifically, the plurality of pixels associated with the display 32 correspond to a subset of memory address locations in the RAM 28. The width, W, and length, L, of the cipher is then retrieved as additional input parameters. The processor operates on the cipher information in the RAM 28 to quantize the same and determines the size of the quantization matrix cells 42. In this fashion, the quantization matrix 40 includes a plurality of cells 42 arranged in N rows and M columns, with each of the plurality of cells 42 having a plurality of pixels 44 corresponding thereto. Although any size of quantization matrix 40 may be employed, it is preferred that the quantization matrix 40 have a size suitable to maintain an aspect ratio of the cipher. Preferably, the quantization matrix is sized so that N=M. Further, the number of pixels in a cell is dependent on the size of the cipher under analysis, i.e., the width and length of the cipher.

After the cipher 38 is overlayed with the quantization matrix 40, a subset of the plurality of pixels 44, of a subgroup of the plurality of cells 42, have a portion of the cipher associated therewith, defining a plurality of portions of the cipher, shown as 38a, 38b, 38c. Next, it is determined whether each of the subset of pixels includes an equal number of pixels, at step 304. This is achieved by determining whether the width, W, is evenly divisible by the width of the quantization matrix 40, as well as determining whether the length, L, is evenly divisible by the length of the quantization matrix 40. If the width, W, is not evenly divisible, then at least one subset of pixels includes pixels in excess of the pixels associated with the remaining subsets of pixels. In this case the excess pixels, referred to as remainder pixels, are associated with memory addresses in the RAM 28 that correspond to pixels 44 located in the cells 42 associated with column $M_1$ and $M_6$. For example, were remainder pixels identified, due to the width, W, not being evenly divisible, then the same would be reassigned an address in RAM 28 that corresponds to column $M_1$ and an image of the cipher would be formed. Then, a second image of the cipher 38 is formed with the remainder pixels being associated with $M_6$. Were the length, L, determined not to be evenly divisible, as discussed above, the remainder pixels identified would be assigned to column $N_1$ and an image of the cipher would be formed. Then, a second image of the cipher 38 would be formed with the remainder pixels being assigned to column $N_6$.

Thereafter, each of the cells 42 of each image are assigned a binary state, i.e., either a logical zero (0) or a logical (1), at step 306. This is achieved by analyzing each cell 42 sequentially, beginning with the cell 42 disposed in row $N_1$ and column $M_1$ and proceeding to analyze the subsequent cells 42 in row $N_1$. Then, the cells 42 of the subsequent rows $N_2$–$N_6$ are analyzed until all cells 42 have been analyzed, with each cell 42 in a given row being analyzed before proceeding to a subsequent row. A cell 42 is assigned a binary state of logical one (1) when two or more pixels are in a subset that corresponds to a portion of the cipher 38. In the example shown, cell 42 disposed at row $N_5$ and column $M_2$ would be one of many cells 42 assigned a logical one (1). If none of the pixels 44 are associated with a sub-portion of the cipher 38, then the cell 42 is assigned a logical zero (0). In the example shown cell 42 disposed at row $N_6$ and column $M_5$ would be one of many cells 42 assigned a logical zero (0). If a cell 42 has only one pixel in the subset associated with the portion of the cipher 38 and contains less than four pixels total, then the cell 42 is assigned a logical (1). If the subset of pixels 44 in the cell 42 defines a portion of the cipher 38 that is arcuate the cell is assigned a logical zero (0) unless one pixel, located proximate to a corner of the cell 42, is associated with the subset and either the cells 42 adjacent in the same row N or adjacent in the same column M is assigned a logical zero (0), then the cell 42 is assigned a logical one (1). A cell 42 is assigned a logical one (1) if the subset of pixels 44 in a cell 42 defines a portion of the cipher 38 that is not arcuate and one pixel, located proximate to a corner of the cell 42, is associated with the subset, unless either the cells 42 adjacent in the same row N or adjacent in the same column M have a corner pixel that is associated with the subset of pixels. Then the cell of interest is assigned a logical zero (0).

After a binary state has been assigned to each of the cells 42 in the matrix 40, a digital word is generated by the microprocessor 24, at step 308. Each bit in the digital word corresponds to a cell 42 in the matrix 40 and is assigned a value that is dependent upon the binary state assigned to the cell 42 that corresponds to the bit. To that end, cell 42 disposed in row $N_1$ and column $M_1$ corresponds to the least significant bit of the digital word, and the cell 42 disposed in row $N_6$ and column $M_6$ corresponds to the most significant bit of the same.

If remainder pixels are present, an additional digital word is generated with each bit corresponding to a cell 42 in the matrix 40 being assigned a value that is dependent upon the binary state assigned to the cell 42 that corresponds to the bit. In this manner, four additional digital words may be generated, as shown below in Table I.

TABLE I

| | Remainder Pixel Matrix Location | | | |
|---|---|---|---|---|
| | Column $M_6$ | Row $N_6$ | Column $M_1$ | Row $N_1$ |
| Digital Word 1 | 1 | 1 | 0 | 0 |
| Digital Word 2 | 0 | 1 | 1 | 0 |
| Digital Word 3 | 0 | 0 | 1 | 1 |
| Digital Word 4 | 1 | 0 | 0 | 1 |

After the digital word has been generated, along with any additional words in the presence of remainder pixels, the digital word is compared to information in a look-up table 50 that is stored in RAM 28, at step 310. The information in the look-up table 50 includes multiple entries, each of which includes a cipher with a corresponding digital representation. The digital word is compared to the digital representation of each entry to identify one or more ciphers corresponding to digital representations that closely match the digital word. To that end, the information in the look-up table 50 is generated using the procedures described above with respect to generating the digital word. To facilitate the comparison, it is preferred that the matrix employed to generate the information in the look-up table 50 have the same dimensions as the quantization matrix 40.

The comparison between the digital word and the digital representation is achieved by comparing the digital word corresponding to a single row, N, to the digital representation in the look-up table 50. Then comparison between each bit is assigned one of three comparison values, a positive value, a negative value and a shift value. For each bit that must be changed to a logical one (1) in the digital word to match the corresponding bit in the digital representation, the total positive value is increased. For each bit that must be changed to a logical zero (0) in the digital word to match the corresponding bit in the digital representation, the total negative value is increased. If a match between the digital word and the digital representation is achieved by shifting the position of value of a bit in the digital word, the positive value total is increased by one-half and the shift total is increased. In this manner, a shift is defined as exchanging the value of adjacent bit positions in the digital word. The following provides an example:

| (1) | digital word | 00001000 |
|---|---|---|
| | digital representation | 00010000 |

A match is achieved by exchanging value of bit five (5) with bit six (6) in the digital word, i.e., a single position which equates to a single shift in the digital representation. It is preferred never to shift any one bit more than one position.

As mentioned above, assignment of the comparison values must be achieved for each of the rows $N_1$–$N_6$. Thereafter, all the total positive values are summed, all the negative values are summed, as are all the shift values. An exclusive-or function is applied to the digital word and the digital representation and the number of resulting bits having a value of logical one (1) are summed, defining an X or total. The Xor total is then multiplied by 0.15, and a final total value is increased by the resulting product. The positive values and the negative values are summed together and multiplied by 0.25, with final total being increased by the resulting product. Next, the total negative value is subtracted from the total positive value and the absolute value of the difference, which is multiplied by 0.25, with the final total being increased by the resulting product. The shift total is subtracted from the positive total with the difference being multiplied by 0.35 and the product, thereof, added to the final total. This is repeated for each of the entries in the look-up table 50. In this manner, a plurality of final values are provided, with the ciphers associated with the digital representations that provide final value of the least magnitude, defining minimum final values, being identified as a match.

An alternative method for comparing the digital word and digital representation that improves computational efficiency includes computation of only the shift value and Xor value. The final value is computed by subtracting twice the shift value from the Xor value. If the final value is less than zero then the final value is set to the value of the Xor value. Thereafter, a second "final value" is determined by computing the shift value by columns instead of rows and again subtracting twice the shift value from the Xor value. The two "final values" are then passed to the fuzzy logic voting procedure, discussed more fully below.

Were more than one digital representation found to provide the minimum final value, a further distinguishing routine is invoked to distinguish between the ciphers of the set of matches. One such distinguishing routine employs dynamic character recognition that involves locating opposed end points 39a and 39b of the cipher, as well as the number of strokes required to form the cipher 38. The opposed end points 39a and 39b are commonly referred to as start points and end points, respectively, of the cipher 38. In this instance the cipher 38 is formed by drawing the portions in the following sequence: 38a, 38b, 38c, 38d, 38e, 38f, 38g, 38h, 38i, 38j, 38k, 38l, 38m, 38n, and 38o. The spatial position of the opposed end points 39a and 39b in the quantization matrix 40 is identified by mapping of the same to a quadrant system. The baselines of the quadrant system extends through the center of the cipher 38 and defines four quadrants. The four quadrants each have a unique address: 0, 2, 4 and 6 starting with the top right quadrant and moving clockwise. Regions between quadrants are assigned addresses of 1, 3, 5 and 7, with 1 being between located proximate to quadrants 0 and 2. The center of the quadrant system is assigned an address 8. In the present example, the cipher 38 starts in quadrant 4 and the start point 39a is assigned a value of 4. The cipher 38 ends in quadrant 6, and the end point 39b is assigned a value of 6. Usually the start and end point information will be present upon digitization of the cipher 38 in an on-line process. However, information concerning the opposed end points 39a and 39b may be extracted from the cipher generated in an off-line process, such as a facsimile transmission, by using methods described in U.S. Pat. No. 5,825,923 to Thompson et. al., which is incorporated by reference herein.

Another distinguishing routine could employ a second look-up table 51 stored in RAM 28 that includes user-defined information therein. In this fashion, the first look-up table 50 may include information of known ciphers produced by the general population, e.g., ciphers generated by a random sample of general population. The second look-up table 51 contains information concerning ciphers generated by the user.

Next, the set of all of the ciphers along with their final totals determined above are processed by a fuzzy logic voting procedure that may include start point, end point and stroke count information or information from the second look-up table 51, if available. The fuzzy logic voting procedure examines the redundancy of each cipher in the set of matches and assigns a value (nt) to each cipher in the set, based upon the same. An example of value (nt) is shown below in Table II.

TABLE II

| Character Count | Value of nt |
|---|---|
| 1 | 0.125 |
| 2 | 0.250 |
| 3 | 0.375 |
| 4 | 0.500 |
| 5 | 0.625 |
| 6 | 0.750 |
| 7 | 0.875 |
| >=8 | 1.000 |

Thereafter, each cipher of the set is assigned a value (minc) based on its minimum final total. An example of values (minc) for ciphers in the set is shown below in Table III.

TABLE III

| Minimum Final Total | Value of minc |
|---|---|
| >=0.0 and <=.50 | 1.0 |
| >0.5 and <=1.0 | 0.9 |
| >1.0 and <=1.5 | 0.8 |
| >1.5 and <=2.0 | 0.7 |
| >2.0 and <3.0 | 0.6 |
| >=3.0 and <4.0 | 0.5 |
| >=4.0 and <5.0 | 0.4 |
| >=5.0 and <7.0 | 0.3 |
| >=7.0 and <9.0 | 0.2 |
| >=9.0 | 0.1 |

Then, each cipher of the set is assigned a value (maxc) based on its maximum final total. An example of values (maxc) of the ciphers associated with the set shown below in Table IV.

TABLE IV

| Maximum Final Total | Value of maxc |
|---|---|
| <=0.0 | 0.0 |
| >0.0 and <=.50 | 0.1 |
| >0.5 and <=1.0 | 0.2 |
| >1.0 and <=1.5 | 0.3 |
| >1.5 and <=2.0 | 0.4 |
| >2.0 and <3.0 | 0.5 |
| >=3.0 and <4.0 | 0.6 |
| >=4.0 and <5.0 | 0.7 |
| >=5.0 and <7.0 | 0.8 |
| >=7.0 and <9.0 | 0.9 |
| >=9.0 | 1.0 |

If end point information is associated with the cipher 38, then a value (pv) is generated. The value (pv) is a function of the similarity between the endpoint and stroke count information in both the digital word and the digital representation. Upon identification of a match, a match total is increased by one. Table V provides values of (pv) for various match totals.

TABLE V

| Match Total | Value of pv |
| --- | --- |
| 0 | −0.99 |
| 1 | −0.33 |
| 2 | 0.33 |
| 3 | 0.99 |

A first fuzzy value ($fv_1$) for the cipher 38 is generated in accordance with the following:

$$(fv_1)=(pv \times 0.125)+(nt \times 0.355)+(minc \times 0.25)-(maxc \times 0.17) \quad (3)$$

The above routine is repeated for each cipher in the set with the cipher having a fuzzy-value ($fv_1$) with the greatest magnitude being selected. If two or more ciphers have the same value ($fv_1$), then the routine is repeated without including endpoint and stroke count information. To that end, the values (nt), (minc), (maxc) and (pv) are generated as described above. From this information a second fuzzy value ($fv_2$) is generated in accordance with the following:

$$(fv_2)=0.10175+(nt \times 0.335)+(minc \times 0.26)-(maxc \times 0.18) \quad (4)$$

If no endpoint data is present in the cipher information, then the cipher associated with $fv_2$ is selected. If endpoint data is present in the cipher information, then the cipher associated with $fv_1$ is selected. If two or more ciphers have the same value ($fv_1$), then cipher associated with the maximum value $fv_2$ is selected. If the same cipher is associated with both the maximum value $fv_1$ and the maximum value $fv_2$, then that cipher is selected. If the maximum value ($fv_2$) is greater than the maximum value ($fv_1$), but less than the maximum ($fv_1$) plus a threshold value, then no selection is made. If the maximum value ($fv_2$) is less than the maximum value ($fv_1$), then select the maximum value ($fv_1$). If the maximum value ($fv_2$) equals the maximum value ($fv_1$) then no selection is made. Otherwise, the cipher associated with maximum value ($fv_2$) is selected. At step 312, after the cipher is chosen, it may be provided as necessary. For example, a visual representation of the cipher may be provided on a display, such as a monitor. In addition, the cipher may be stored in a computer-readable memory or output to a peripheral device, such as a printer.

Although the foregoing has been described with respect to single cipher recognition, it should be understood that the present invention is typically employed to recognize multiple ciphers disposed adjacent to one another as may be found in hand-written words or sentences. Further, the present invention may be employed to recognize any type of object so long as information corresponding to the object may be put in a form that may be analyzed by a microprocessor. To that end, the present invention may be used to detect remotely disposed objects, the images of which have been captured using known optical sensing technology, such as a charge-coupled device array, electron beam camera and the like. The scope of the invention should, therefore, be determined not with reference to the above description, but instead should be determined with reference to the appended claims along with their full scope of equivalents.

What is claimed is:

1. A method for recognizing a cipher, said method comprising:

associating said cipher with a plurality of cells of a matrix having N rows and M columns, with each of said plurality of cells having a plurality of pixels corresponding thereto, with a subset of said plurality of pixels, of a subgroup of said plurality of cells, having a portion of said cipher associated therewith, defining a plurality of portions of said cipher, wherein subsets of said plurality of pixels having a number of pixels associated therewith in excess of a number of pixels associated with the remaining subsets, defining remainder pixels, are positioned in predetermined cells of said matrix;

determining whether each of said subset of pixels includes an equal number of pixels;

assigning a binary state identifier with each cell of said plurality of cells;

assigning a digital word to said matrix, with said digital word being a function of the binary state of said plurality of cells, wherein said assigning includes forming digital data which corresponds to said predetermined position, with said digital work including said digital data;

comparing said digital word with information in a look-up table, said information including a plurality of known ciphers, each of which includes a corresponding digital representation; and providing the known cipher corresponding to the digital representation in said look-up table that most closely matches said digital word.

2. The method as recited in claim 1 wherein comparing said digital word includes comparing a sub-portion of said digital word with said information, with said sub-portion corresponding to said binary state of pixels in a single row of said matrix.

3. The method as recited in claim 1 wherein said information includes user defined data.

4. The method as recited in claim 1 wherein said cipher includes opposed ends and sub-portions of said digital word includes information corresponding to spatial positions of said opposed ends.

5. The method as recited in claim 1 wherein comparing said digital word with information in said look-up table includes comparing a sub-portion of said digital word with said information, with said sub-portion corresponding to said binary state of pixels in a single row of said matrix for each row in said matrix and obtaining a final value, with said final value being a function of a difference characteristic between said digital word and said digital representation.

6. The method as recited in claim 1 wherein comparing said digital word with each digital representation in said look-up table includes obtaining multiple final values, each of said multiple final values being a function of a difference characteristic between said digital word and said digital representation and providing said known cipher corresponding to the digital representation in said look-up table including providing said known cipher associated with the digital representation corresponding to a subset of said multiple final values, said subset including final values having a least magnitude of said multiple final values.

7. The method as recited in claim 1 wherein comparing said digital word with each digital representation in said look-up table includes obtaining multiple final values, each of said multiple final values being a function of a difference characteristic between said digital word and said digital representation and providing said known cipher corresponding to the digital representation in said look-up table including providing said known cipher associated with the digital representation corresponding to each of a subset of said multiple final values, said subset including final values having a least magnitude of said multiple final values and further including distinguishing between multiple final values of said subset by associating a fitness value with each of the final value of said subset, with said fitness value being a function of a number of times a digital representation is associated with one of said multiple values of said subset.

8. The method as recited in claim 1 wherein N equals M.

9. The method as recited in claim 1 wherein said binary state is a one (1) or a zero (0).

10. A computer program product that controls a computer to recognize a cipher, said computer program product comprising a computer readable medium encoded with code comprising:

code to associate said cipher with a plurality of cells of a matrix having N rows and M columns, with each of said plurality of cells having a plurality of pixels corresponding thereto, with a subset of said plurality of pixels, of a subgroup of said plurality of cells, having a portion of said cipher associated therewith, defining a plurality of portions of said cipher, wherein subsets of said plurality of pixels having a number of pixels associated therewith in excess of a number of pixels associated with the remaining subsets, defining remainder pixels, are positioned in predetermined cells of said matrix;

code to determine whether each of said subset of pixels includes an equal number of pixels;

code to assign a binary state identifier with each cell of said plurality of cells;

code to assign a digital word to said matrix, with said digital word being a function of the binary state of plurality of cells, wherein said code to assign a digital word to said matrix includes code to form digital data which corresponds to said predetermined position, with said digital word including said digital data;

code to compare said digital work with information in a look-up table, said information including a plurality of known ciphers, each of which includes a corresponding digital representation; and code to provide the known cipher corresponding to the digital representation in said look-up table that most closely matches said digital word.

11. The computer program product as recited in claim 10 wherein said code to compare said digital word includes code to compare a sub-portion of said digital word with said information, with said sub-portion corresponding to said binary state of pixels in a single row of said matrix.

12. The computer program product as recited in claim 10 wherein said information includes user defined data.

13. The computer program product as recited in claim 10 wherein said cipher includes opposed ends and sub-portions of said digital word includes information corresponding to spatial positions of said opposed ends.

14. The computer program product as recited in claim 10 wherein said code to compare said digital word with information in said look-up table includes code to compare a sub-portion of said digital word with said information, with said sub-portion corresponding to said binary state of pixels in a single row of said matrix for each row in said matrix and obtaining a final value, with said final value being a function of a difference characteristic between said digital word and said digital representation.

15. The computer program product as recited in claim 10 wherein said code to compare said digital word with each digital representation in said look-up table includes code to obtain multiple final values, each of said multiple final values being a function of a difference characteristic between said digital word and said digital representation and said code to provide said known cipher corresponding to the digital representation in said look-up table including code to provide said known cipher associated with the digital representation corresponding to a subset of said multiple final values, said subset including final values having a least magnitude of said multiple final values.

16. The computer program product as recited in claim 10 wherein code to compare said digital word with each digital representation is said look-up table includes code to obtain multiple final values, each of said multiple final values being a function of a difference characteristic between said digital word and said digital representation and said code to provide said known cipher corresponding to the digital representation in said look-up table includes code to provide said known cipher associated with the digital representation corresponding to each of a subset of said multiple final values, said subset including final values having a least magnitude of said multiple final values and further including distinguishing between multiple final values of said subset by associating a fitness value with each of the final values of said subset, with said fitness value being a function of a number of times a digital representation is associated with one of said multiple values of said subset.

17. The computer program product as recited in claim 10 wherein N equals M.

18. The computer program product as recited in claim 10 wherein said binary state is a one (1) or a zero (0).

19. A system for recognizing a cipher comprising:

means for associating said cipher with a plurality of cells of a matrix having N rows and M columns, with each of said plurality of cells having a plurality of pixels corresponding thereto, with a subset of said plurality of pixels, of a subgroup of said plurality of cells, having a portion of said cipher associated therewith, defining a plurality of portions of said cipher, wherein subsets of said plurality of pixels having a number of pixels associated therewith in excess of a number of pixels associated with the remaining subsets, defining remainder pixels, are positioned in predetermined cells of said matrix;

means, in data communication with said means for associating, for determining whether each of said subset of pizels includes an equal number of pixels;

means, in data communication with said means for determining, for assigning a binary state identifier with each cell of said plurality of cells;

means, in data communication with said means for assigning a binary state identified, for assigning a digital word to said matrix, with said digital word being a function of the binary state of said plurality of cells, wherein said means for assigning a digital word to said matrix includes a means for forming digital data which corresponds to said predetermined position, with said digital word including said digital data;

means, in data communication with said means for assigning a digital word, for comparing said digital word with information in a look-up table, said information including a plurality of known ciphers, each of which includes a corresponding digital representation; and means, in data communication with said means for comparing, for providing the known cipher corresponding to the digital representation in said look-up table that most closely matches said digital word.

20. The system as recited in claim 19 wherein comparing said digital word includes comparing a sub-portion of said digital word with said information, with said sub-portion corresponding to said binary state of pixels in a single row of said matrix.

21. The system as recited in claim 19 wherein said information includes user defined data.

22. The system as recited in claim 19 wherein said cipher includes opposed ends and sub-portions of said digital word includes information corresponding to spatial positions of said opposed ends.

23. The system as recited in claim 19 wherein said means for comparing said digital word with information in said look-up table includes means for comparing a sub-portion of said digital word with said information, with said sub-portion corresponding to said binary state of pixels in a single row of said matrix for each row in said matrix and obtaining a final value, with said final value being a function of a difference characteristic between said digital word and said digital representation.

24. The system as recited in claim 19 wherein means for comparing said digital word with each digital representation in said look-up table includes means for obtaining multiple final values, each of said multiple final values being a function of a difference characteristic between said digital word and said digital representation and means for providing said known cipher corresponding to the digital representation in said look-up table includes means for providing said known cipher associated with the digital representation corresponding to a subset of said multiple final values, said subset including final values having a least magnitude of said multiple final values.

25. The system as recited in claim 19 wherein said means for comparing said digital word with each digital representation in said look-up table includes means for obtaining multiple final values, each of said multiple final values being a function of a difference characteristic between said digital word and said digital representation and said means for providing said known cipher corresponding to the digital representation in said look-up table including means for providing said known cipher associated with the digital representation corresponding to each of a subset of said multiple final values, said subset including final value having a least magnitude of said multiple final values and further including distinguishing between multiple final values of said subset by associating a fitness value with each of the final values of said subset, with said fitness value being a function of a number of times a digital representation is associated with one of said multiple value of said subset.

26. The system as recited in claim 19 wherein N equals M.

27. The system as recited in claim 19 wherein said binary state is a one (1) or a zero (0).

* * * * *